US010498553B2

(12) United States Patent
Borkhuis et al.

(10) Patent No.: US 10,498,553 B2
(45) Date of Patent: Dec. 3, 2019

(54) CONNECTING A PLURALITY OF SLAVE UNITS TO A MASTER CONTROL UNIT IN A DISTRIBUTED CONTROL SYSTEM

(71) Applicant: OMRON Corporation, Kyoto-shi, Kyoto (JP)

(72) Inventors: Johan Borkhuis, Haarlem (NL); Frank Jan Exoo, 's-Hertogenbosch (NL)

(73) Assignee: OMRON Corporation, Kyoto-shi (JP)

( * ) Notice: Subject to any disclaimer, the term of this patent is extended or adjusted under 35 U.S.C. 154(b) by 31 days.

(21) Appl. No.: 15/305,181

(22) PCT Filed: Apr. 29, 2015

(86) PCT No.: PCT/IB2015/000594
§ 371 (c)(1),
(2) Date: Oct. 19, 2016

(87) PCT Pub. No.: WO2015/166332
PCT Pub. Date: Nov. 5, 2015

(65) Prior Publication Data
US 2017/0163440 A1    Jun. 8, 2017

(30) Foreign Application Priority Data

Apr. 30, 2014   (DE) .................. 10 2014 006 231

(51) Int. Cl.
*H04L 12/40* (2006.01)
*H04L 12/423* (2006.01)

(52) U.S. Cl.
CPC ...... *H04L 12/40176* (2013.01); *H04L 12/423* (2013.01); *H04L 2012/40215* (2013.01); *H04L 2012/40221* (2013.01)

(58) Field of Classification Search
None
See application file for complete search history.

(56) References Cited

U.S. PATENT DOCUMENTS

| 5,790,572 A | 8/1998 | Oguro et al. |
| 8,072,999 B1 | 12/2011 | Cline et al. |

(Continued)

FOREIGN PATENT DOCUMENTS

| CN | 1080502 C | 3/2002 |
| EP | 1717978 A1 | 11/2006 |

(Continued)

OTHER PUBLICATIONS

Japanese Office Action dated Nov. 28, 2017 in the counterpart Japanese patent application.

(Continued)

*Primary Examiner* — Yemane Mesfin
*Assistant Examiner* — Jeff Banthrongsack
(74) *Attorney, Agent, or Firm* — Metrolex IP Law Group, PLLC

(57) ABSTRACT

A method of connecting a plurality of first slave units in a distributed control system, a distributed control system and a master control unit. The system comprises a master control unit, a plurality of first slave units. The system further comprises a second slave unit which comprises a first communication port, a second communication port and a third communication port. The method further comprises forming a chain of first slave units from the plurality of first slave units, communicatively connecting the master control unit to the first communication port of the second slave unit, communicatively connecting a first communication port of a front slave unit of said chain of first slave units to the second communication port of the second slave unit and communicatively connecting a second communication port of a rear slave unit of said chain to the third communication port of the second slave unit.

18 Claims, 6 Drawing Sheets

(56) References Cited

U.S. PATENT DOCUMENTS

| | | | |
|---|---|---|---|
| 2009/0083464 A1* | 3/2009 | Beckhoff | H04L 12/423 710/110 |
| 2011/0205886 A1 | 8/2011 | Maruyama et al. | |
| 2014/0047056 A1 | 2/2014 | Tahara et al. | |

FOREIGN PATENT DOCUMENTS

| | | | | |
|---|---|---|---|---|
| EP | 2362585 A1 | 8/2011 | | |
| EP | 2672662 A1 | 12/2013 | | |
| JP | H5-327743 A | 12/1993 | | |
| JP | H8-214019 A | 8/1996 | | |
| JP | 2009-130519 A | 6/2009 | | |
| JP | 2009-534963 A | 9/2009 | | |
| JP | 2011-176718 A | 9/2011 | | |
| JP | 2011-199420 A | 10/2011 | | |
| JP | 2012-28931 A | 2/2012 | | |
| JP | 2013-48477 A | 3/2013 | | |
| JP | 2013-207452 A | 10/2013 | | |
| WO | 2012124160 A1 | 9/2012 | | |
| WO | 2013064866 A1 | 5/2013 | | |
| WO | WO-2013064866 A1 * | 5/2013 | ....... | H04L 12/40019 |
| WO | WO 2013064866 A1 * | 5/2013 | ....... | H04L 12/40019 |

OTHER PUBLICATIONS

Ethercat Technology Group, EtherCAT Introduction, Oct. 2012, retrieved on Jan. 12, 2017 from http://www.ethercat.org/pdf/english/EtherCAT_Introduction_EN.pdf.

Beckhoff, EtherCAT Slave Controller ESC Datasheet Section 1, version 2.2, dated Jul. 7, 2014, retrieved on Jan. 12, 2017 from http://download.beckhoff.com/download/Document/EtherCAT/Development_products/EtherCAT_ESC_Datasheet_Sec1_Technology_2I1.pdf.

Japanese Office Action dated Sep. 12, 2017 in a counterpart Japanese patent application.

Mladen Knezic et al., Topology Aspects in EtherCAT Networks, 14th International Power Electronics and Motion Control Conference, EPE-PEMC 2010, cited in the ISR.

C. L. Toh et al., "A High Speed Control Network Synchronization Jitter Evaluation for Embedded Monitoring and Control in Modular Multilevel Converter", 2013 IEEE Grenoble Conference (Jun. 16-20, 2013), Relevance is indicated in the (translated) CNOA issued on Nov. 26, 2018.

(Translated) Chinese Office Action dated Nov. 26, 2018 in a counterpart Chinese patent application.

* cited by examiner

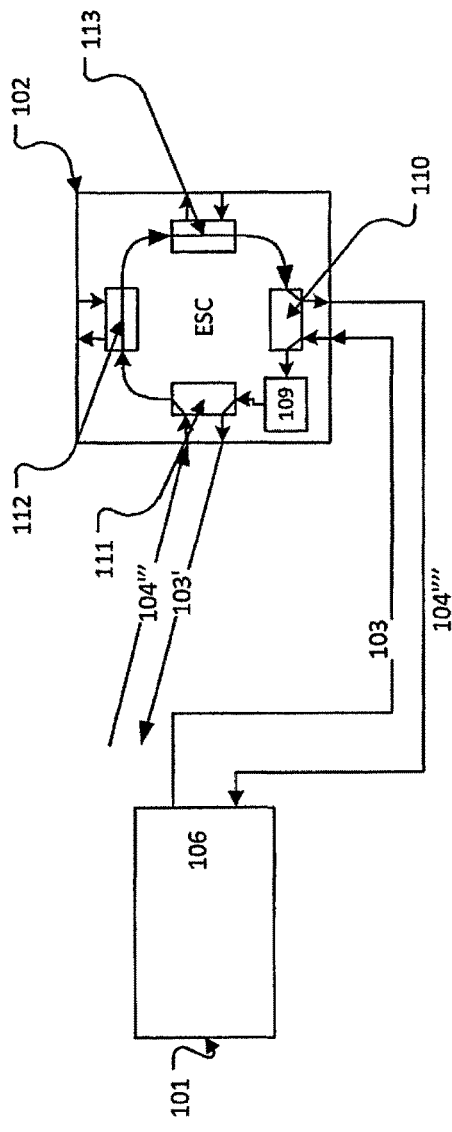
Fig. 1a State of the art
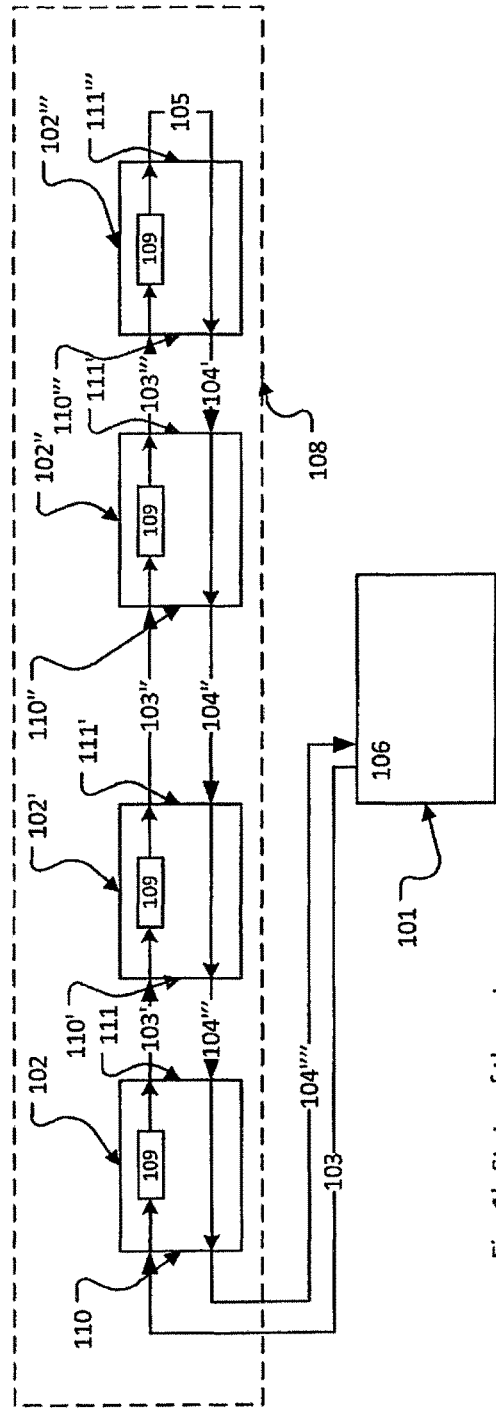
Fig. 1b State of the art

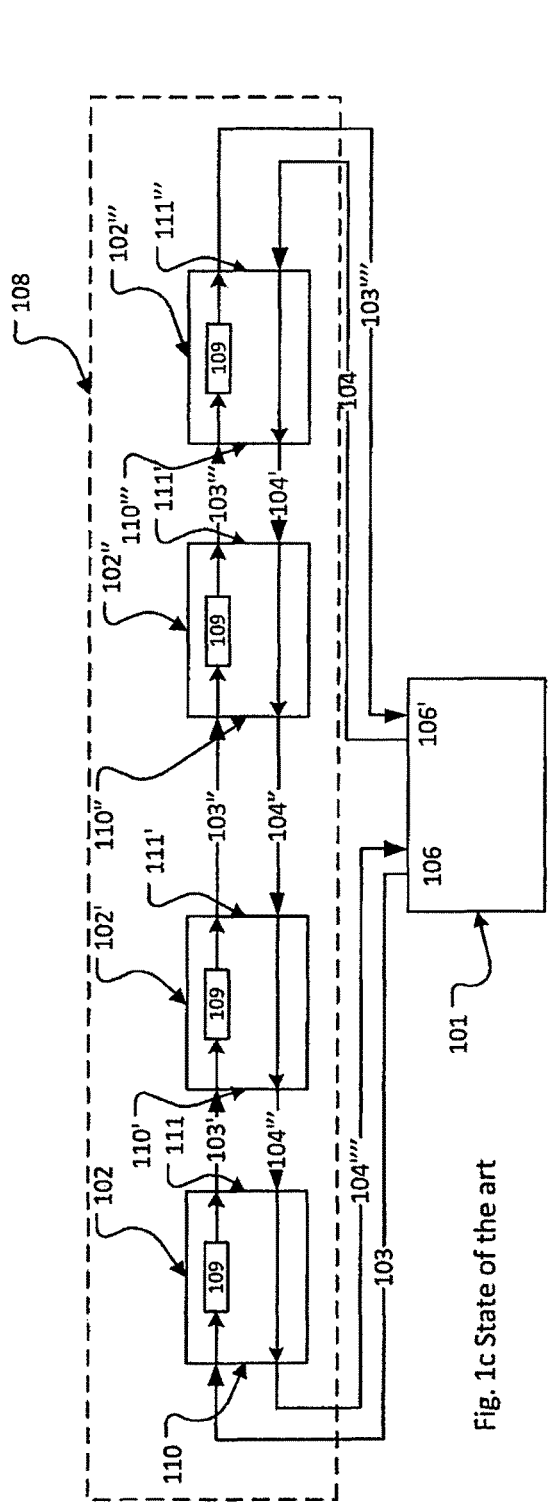
Fig. 1c State of the art
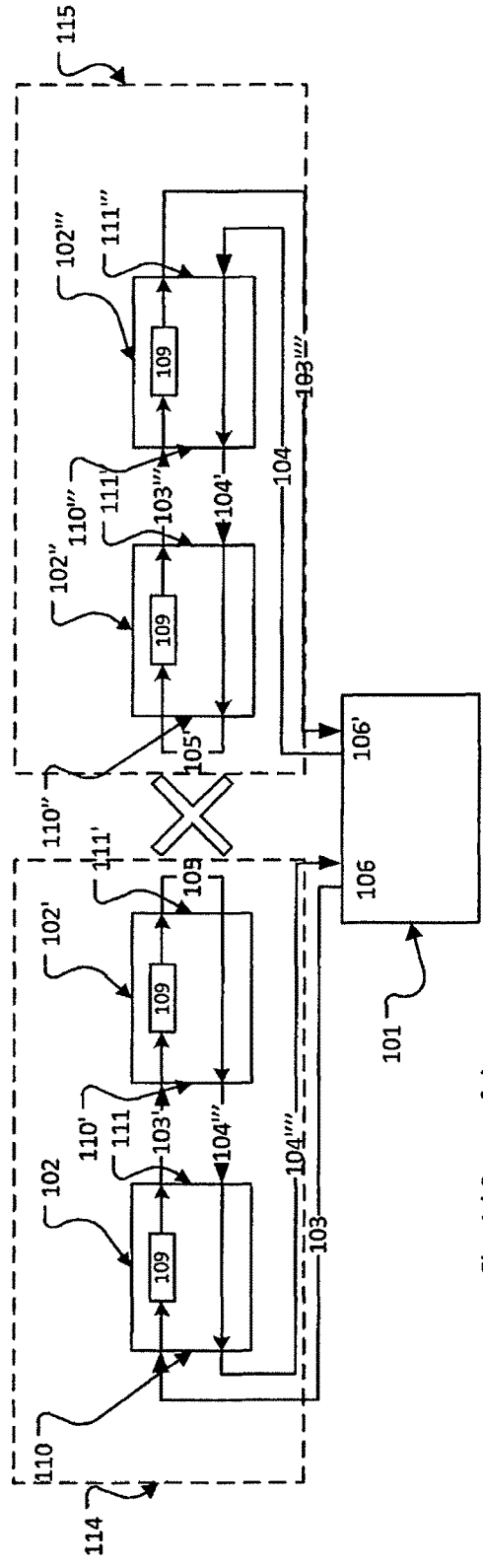
Fig. 1d State of the art

CONNECTING A PLURALITY OF SLAVE UNITS TO A MASTER CONTROL UNIT IN A DISTRIBUTED CONTROL SYSTEM

FIELD OF THE INVENTION

The invention relates to a method of connecting a plurality of slave units to a master control unit in a distributed control system, and a distributed control system.

BACKGROUND OF THE INVENTION

Slave units in distributed industrial control systems are connected to master control units in chains such that they can be controlled centrally. Each slave unit has a first communication port via which commands are received, processed and exchanged to a second communication port to communicate with further slave units in the chain. Communication ports in a slave unit are bidirectional, and are configured such that an input of the second communication port is communicatively connected to an output in the first communication port. This enables information generated down the chain to be sent in reverse direction up the chain. Also commands which have been sent down the chain in forward direction can be sent back for forwarding data output by the slave units to the master control unit via the reverse direction. To that end the last slave unit in the chain, which has no further connection to another slave unit, has a closed second communication port which loops back the commands to the first communication port by which the command entered the slave unit.

A problem with forwarding commands in a distributed control system having a chain of slave units according to the state of the art is that when an interruption in the communication occurs in the slave unit chain, such that the chain breaks up in to two sections, only the first section before the interruption receives the commands, whereas the second section after the disconnection or interruption no longer receives commands. This causes potential failure of the control system as a whole, as cooperation of parts of the chain of slave units may be essential.

In the state of the art, it has been established that the last slave unit of a chain of slave units can be connected to a second port of the master control unit, instead of closing the last communication port of the last slave unit. Commands need no longer be looped back through the chain in reverse direction, but are received at the second communication port of the master control unit. Thus a redundant path within the chain of slave units is created.

When an interruption in the chain of slave units occurs, the slave units at both sides of the interruption close their bordering ports such that two sub chains are formed, wherein one sub chain receives its commands via the former route by forwarding commands down the sub chain and back in reverse direction, whereas the second sub chain receives commands form the second communication port of the master control unit via the reverse path first and looped back via the forward path to the second communication port, thereby utilizing the redundant path in reverse direction.

A disadvantage of this approach is that the master control unit needs to utilize two communication ports, to create the redundant path in a single chain of slave units, i.e. one communication port for each sub chain after an interruption in the communication, where communication ports may be scarce.

SUMMARY OF THE INVENTION

The above described disadvantage is overcome according to a first aspect of the invention by a method of connecting a plurality of first slave units in a distributed control system. The system comprises a master control unit, a plurality of first slave units, wherein each first slave unit has a first communication port and a second communication port. Each communication port has an input and an output. Each first slave unit has the input of the first communication port internally communicatively connected to the output of the second communication port and the input of the second communication port internally communicatively connected to the output of the first communication port. The system further comprises a second slave unit which comprises a first communication port, a second communication port and a third communication port, wherein each communication port has an input and an output. In the second slave unit the input of the first communication port is internally communicatively connected to the output of the second communication port, the input of the second communication port is internally communicatively connected to the output of the third communication port, and the input of the third communication port is internally communicatively connected to the output of the first communication port.

The method further comprises forming a chain of first slave units from the plurality of first slave units, communicatively connecting the master control unit to the first communication port of the second slave unit, communicatively connecting a first communication port of a front slave unit of said chain of first slave units to the second communication port of the second slave unit. The method further comprises communicatively connecting a second communication port of a rear slave unit of said chain to the third communication port of the second slave unit.

By the above described method it is achieved that a redundant path is created in the reverse communication direction of said chain of first slave units, such that when a disconnection occurs in said chain, i.e. breaking the chain of first slave units into two sub chains of first slave units, communication frames carrying commands will be routed from the master control unit to the second slave unit, then to the first sub chains, via the first sub chain in forward direction and via the redundant path in the first sub chain back to the second slave unit, and subsequently from the second slave unit to a second sub chain of first slave units via the redundant path first and then through the remaining slave units and back to the second slave unit and finally back to the master control unit.

An additional advantage is that the order of processing a command frame in the slave units is the same as before the disconnection occurred. Thus continued operation of the system is secured, which can be a benefit especially for critical processes or machines to be controlled, without any rerouting or reconfiguration of the master control unit, nor of the second slave unit. It is sufficient to connect the chain of slave units to the second slave unit as described.

An embodiment of the invention comprises disconnecting the rear first slave unit of the chain of first slave units from the second slave unit. For each slave unit in the chain of first slave units a first propagation delay is measured via the second communication port of the second slave unit. The first propagation delays are stored in a data storage.

After a disconnection in the chain of first slave units, propagation delays to any first slave unit can be measured according to the state of the art, in accordance of which clock offsets may be calculated and loaded into the respective first slave units. This is however a time consuming task. The measuring of propagation delays and storing them prior to the occurrence of a disconnection in the chain of first slave units according to the embodiment of the invention, allows rapid calculation and loading of clock offsets after a disconnection in the chain of first slave units. Thus distributed clock operation of the slave units after the disconnection can be resumed more rapidly.

In a further embodiment, wherein the disconnecting the rear first slave unit of the chain of first slave units from the second slave unit comprises closing the second communication port of the rear first slave unit of the chain of first slave units, closing the third communication port of the second slave unit, allows a master control unit or any other device to perform the required disconnecting of the chain of first slave units automatically by sending commands to that end to the first and second slave units involved. No manual intervention in disconnecting the chain of first slave units is required.

Another embodiment, further comprises disconnecting the front first slave unit of the chain of first slave units from the second slave unit, for each slave unit in the chain of first slave units measuring a second propagation delay via the third communication port of the second slave unit, storing the second propagation delays for each first slave unit of the chain of first slave units in a data storage.

This allows as a consequence the propagation delays also to be measured via the redundant path first, so the second sub chain, which receives communication frames via the redundant path first, can be provided with correct clock offsets calculated from the measured propagation delays which take the redundant path in reverse direction into account.

In a further embodiment, wherein the disconnecting the front first slave unit of the chain of first slave units from the second slave unit comprises closing the first communication port of the front first slave unit of the chain of first slave units, and closing the second communication port of the second slave unit, allows a master control unit or any other device to perform the required disconnecting of the chain of first slave units automatically by sending commands to that end to the first and second slave units involved. No manual intervention in disconnecting the chain of first slave units is required.

A further embodiment comprises detecting a disconnection of one of the first slave units in the chain of first slave units, determining a position of the disconnection in the chain of first slave units on the basis of a detected disconnection of one of the first slave units, calculating clock offsets for each first slave unit of the chain of first slave units depending on the determined position and the stored first and second propagation delays, and loading the calculated clock offsets in each respective slave unit of the chain of first slave units.

The above described disadvantage is also overcome according to a second aspect of the invention by a distributed control system, the system comprising a master control unit, a plurality of first slave units, wherein each first slave unit has a first communication port and a second communication port. Each communication port has an input and an output, and each first slave unit has the input of the first communication port internally communicatively connected to the output of the second communication port and the input of the second communication port internally communicatively connected to the output of the first communication port. The plurality of first slave units are communicatively connected in a chain of first slave units.

The system further comprises a second slave unit comprising a first communication port, a second communication port and a third communication port, wherein each communication port has an input and an output. The input of the first communication port is internally communicatively connected to the output of the second communication port, the input of the second communication port is internally communicatively connected to the output of the third communication port, and the input of the third communication port is internally communicatively connected to the output of the first communication port. The master control unit is communicatively connected to the first communication port of the second slave unit. The first communication port of the front slave unit of said chain of first slave units is communicatively connected to the second communication port of the second slave unit. The system furthermore comprises that the second communication port of the rear first slave unit of said chain of first slave units is communicatively connected to the third communication port of the second slave unit.

The system as described provides the same effects and advantages as the method describe above.

In an embodiment of the system, the master control unit is arranged for measuring first propagation delays of each slave unit in the chain of first slave units via the second communication port of the second slave unit. The chain of first slave units is for this purpose disconnected at the rear first slave unit from the second slave unit. The master control unit is further arranged for storing the first propagation delays in a data storage. The disconnecting can be performed manually.

In a further embodiment of the system, the master control unit is further arranged for closing the second communication port of the rear first slave unit of the chain of first slave units and for closing the third communication port of the second slave unit. This way no manual intervention is required.

In a further embodiment of the system, the master control unit is further arranged for measuring second propagation delays of each slave unit in the chain of first slave units via the third communication port of the second slave unit, wherein the chain of first slave units is disconnected at the front first slave unit from the second communication port of the second slave unit. The master control unit is further arranged for storing the second propagation delays for each first slave unit of the chain of first slave units in the data storage. The disconnecting of the chain of first slave units can be performed manually.

In yet a further embodiment of the system, the master control unit is further arranged for closing the first communication port of the front first slave unit of the chain of first slave units, and closing the second communication port of the second slave unit. This way no manual intervention is required.

In an embodiment of the system each of the first slave units is further arranged for detecting a disconnection in the chain of first slave units. The master control unit is arranged for determining a position of the disconnection in the chain of first slave units on the basis of a detected disconnection of one of the first slave units. The master control unit is further arranged for calculating clock offsets for each first slave unit of the chain of first slave units depending on the determined position of the disconnection and the stored first and second propagation delays and loading the calculated clock offsets in each respective slave unit of the chain of first slave units.

The object is also achieved according to a third aspect of the invention, in a master control unit comprising a processing unit, and at least one communication port for connecting to at least one slave unit. The processing unit is communicatively connected to the at least one communication port and connected to a data storage. The processing unit is arranged for performing steps of the method and is arranged in accordance with the embodiments of the system described above. In an embodiment, the data storage is incorporated in the master control unit.

BRIEF DESCRIPTION OF THE DRAWINGS

The invention will now be explained in more detail with reference to the figures, in which:

FIG. 1a shows a block diagram of a control system according to the state of the art;

FIG. 1b shows a block diagram of a distributed control system according to the state of the art;

FIG. 1c shows a further block diagram of a distributed control system having a redundant path according to the state of the art;

FIG. 1d shows a block diagram of a distributed control system after a disconnection according to the state of the art;

DETAILED DESCRIPTION OF THE EMBODIMENTS

Figure 2A:
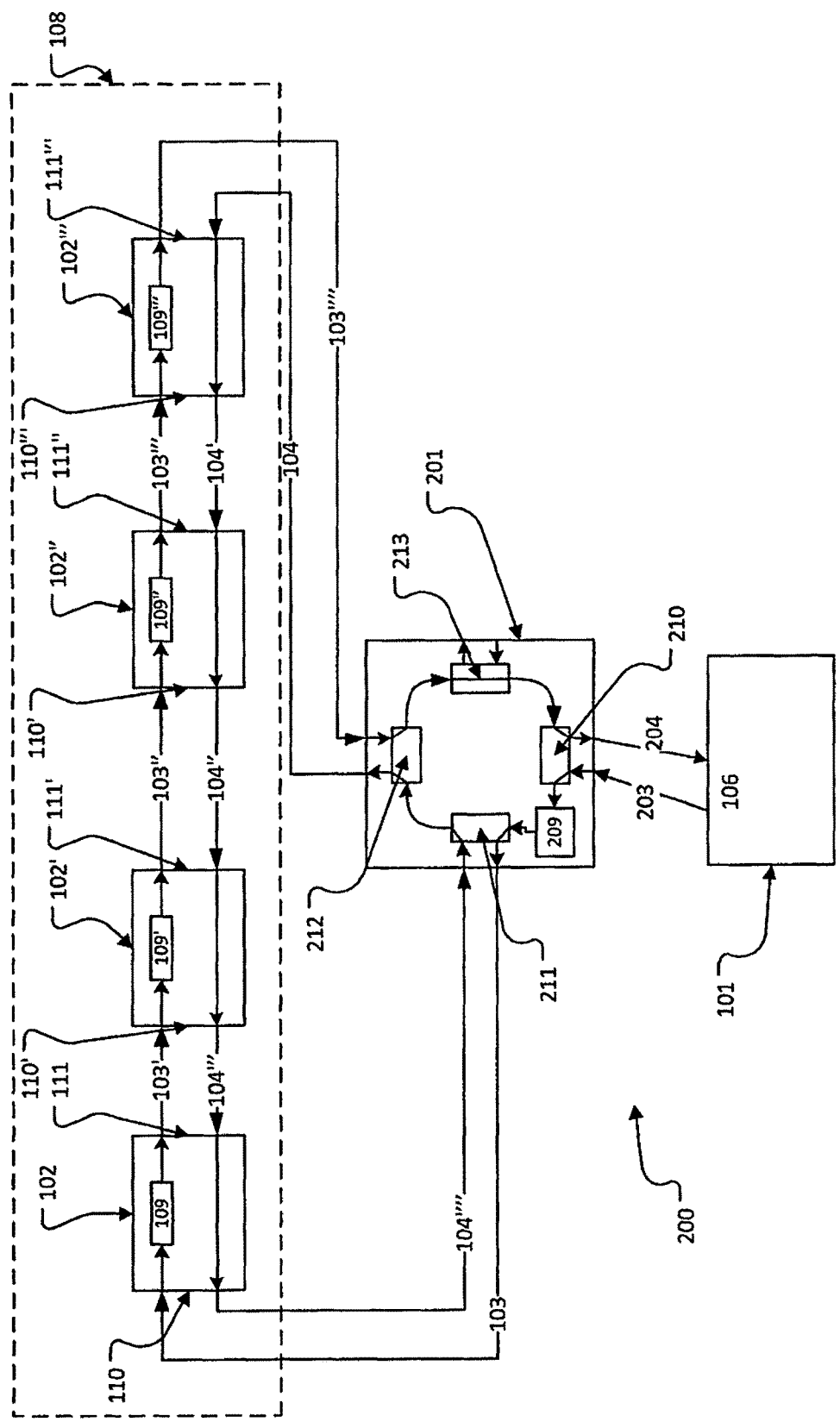
FIG. 2a shows a block diagram of a distributed control system according to the invention.

FIG. 1a shows an industrial control system according to the state of the art comprising a master control unit 101 communicatively connected 103, 104'''' with a slave control unit or slave unit 102. The master control unit 101 uses a communication port 106 to communicate with the slave unit 102. The master control unit 101 issues, commands to one or more slave units 102 which process these commands and perform control actions such as analogue or digital input or output to applications such as for example drive systems on oil rigs, valve control in chemical plants, etc.

A master control unit 101 is generally programmed to perform coordinated control functions using state machine control and regulation functions. The master control unit 101 can be connected to further information processing systems for achieving commands and exchanging information on a yet higher aggregation level. Communication between master control units 101 and slave units 102 occurs using industrial automation communication protocols such as Controller Area Network (CAN)™, EtherNet/IP™, EtherCAT™, Profinet IO™, Profibus™, etc. More specifically in the case of EtherCAT™, communication between various components of an industrial control system is performed using an Ethernet™ Fieldbus Protocol. This protocol allows fast response times on control commands issued from a master controller in slave units connect to the master controller. In EtherCAT™, data is transferred in communication frames comprising an Ethernet header, data, check sum and an interpacket gap to separate frames from each other. Details of EtherCAT™ fieldbus are described in [1]. More specifically page 7 of [1] describes communication frames used for communication in a network of interconnected master control and slave units.

Communication in the EtherCAT™ fieldbus is bidirectional. A communication port used for communication between a master control unit and a slave unit or between slave units always have an input and an output, which can be connected to an output and input respectively of another unit.

A slave unit 102 has a plurality of circularly interconnected bidirectional communication ports. Industrial slave units such as EtherCAT™ slave units generally have two of such communication ports. Certain EtherCAT™ slave units can have up to four communication ports.

A communication port 110-113 can be in two states, open or closed. In the open state a communication port in the open state may receive externally communication frames at its input and forward these frames internally, i.e. within the slave unit, to the next communication port, if the next communication port is in the open state the communication frames are forwarded to the output of the communication port. A communication port in the closed state internally forwards a communication frame from its predecessor communication port to the next communication port without enabling its output or input. Furthermore, each communication port is arranged such that when a communication port detects that it has no external connection, i.e. a disconnected input and output, it changes the communication port status to closed and forwards any communication frames from the previous communication port to the next communication port. A slave unit 102 can change a communication port state also upon receipt of a command for that purpose. Such a command is preferably issued by the master control unit 101 to which the slave unit 102 is communicatively connected.

In the example as shown in FIG. 1a, the slave unit 102 has four communication ports, of which communication ports 110 and 111 are in the open state. This allows commands sent via communication line 103, received at the input of port 110 to be forwarded to the next communication port 111, where it is outputted. Communication ports 112 and 113 are in the closed state. Communication frames received at the input of communication port 111 are forwarded to communication ports 112 and 113 respectively and outputted at the output of communication port 110.

As also shown in FIG. 1a, a processing unit 109 is included between two communication ports 110 and 111. By connecting communication port 110 to the master control unit 101, the processing unit 109 can act on commands received from the master control unit 101 at the input of communication port 110. The processing unit 109 is arranged to control the behaviour and state of the slave unit. One of such actions can be the changing of the state of any communication port 110-113 of the slave unit 102 from open to closed and vice versa. This allows the master control unit 101 to control the communication state of each port 110-113 in a slave unit 102 by sending a command to the processing unit of a slave unit for that purpose. Also, when a disconnection is detected, the slave unit processing unit can send a signal indicating the change of state of the communication port, and its identity. The master control unit 101 then queries the port status.

Further, processing unit 109 can insert data to be sent to master control unit 101 into a communication frame during the frame going through the processing unit 109.

FIG. 1b shows a block diagram of a distributed control system according to the state of the art. Master control unit 101 is connected to plural slave units 102-102''' which are connected in a chain 108.

The chain of first slave units 108 is formed from the plurality of first slave units 102, 102', 102'', 102''' by communicatively connecting 103', 104''' the second communication port 111 of a front slave unit 102 to the first communication port 110' of the next first slave unit 102' of the plurality of slave units and repeating the communicatively connecting 103'', 103''', 104'', 104' subsequent slave units 102'' until the rear slave unit 102''' of the plurality of slave units is connected.

In the shown example, each of the slave units 102-102''' in the chain of slave units 108 have two communication ports 110-110''', 111-111''' respectively in the open state, while remaining communication ports are in the closed state, causing a communication frame inputted at the first open communication port 110-110''' to be forwarded on to the second open communication port 111-111''', where it is outputted. Likewise, communication frames inputted at the second open communication port 111-111''' are forwarded on to the first open communication port 110-110''' where they are outputted.

In practice, a chain of slave units 108 need not be linear. Side branches of slave units of the main chain 108 may occur, for example where a slave unit in a chain has three ports in an open state, one connected to an upstream part of the chain, and two ports connected to two respective downstream sub chains, as illustrated on page 10 of [1].

The rear slave unit 102''' in the chain 108 of FIG. 1b has no further connection to another slave unit in the chain 108. Thus the last port 111''' is set in the closed state indicated by internal connection 105.

This allows communication frames sent through the chain of slave units 108 in forward direction 103-103''' to be looped back via the chain of slave units 108 in reverse direction 104'-104'''' to the master control unit 101, which can then forward the communication frames including data output by the slave units 102-102''' to the master control unit 101.

FIG. 1c shows a further block diagram of a distributed control system having a redundant path according to the state of the art. In FIG. 1c the chain of slave units 108 is not only connected to a front slave unit 102 using connections 103 and 104 to the master control unit 101 at the first port 106, but also connected at a rear slave unit 102''' using connections 103'''' and 104 to a second port 106' of the master control unit 101.

Communication frames sent from the first port 106 of the master control unit 101 via connection 103 to the front slave unit 102 are forwarded down the chain of slave units 108 and are received back through connection 103'''' at the second port 106' of the master control unit 101. These received communication frames can be processed in the control unit 101 instantly, or sent back via the second communication port 106' using connection 104 and looped back via connection 104'''' to the first port 106 of the master control unit 101. The path using connections 104-104'''' is in fact a redundant path.

FIG. 1d shows a block diagram of a distributed control system after disconnection according to the state of the art. The disconnection is in the example between slave units 102' and 102''. As a consequence of the disconnection the respective slave units 102', 102'' close the ports 111', 110'' which are now closed, as indicated by internal connections 105, 105' respectively. This causes a first sub chain 114 being formed with slave units 102, 102'. A communication frame sent from the first communication port 106 of the master control unit 101 via connection 103 is looped via internal connection 105, and connections 104''' and 104'''' back to the first communication port 106. When detecting a state change at ports 111' and 110'', these ports signal the master control unit 101 which consequently detects the disconnection.

Having detected the disconnection between slave units 102' and 102'', the master control unit 101 can forward the communication frame received back at the input of the first port 106 to the output of the second communication port 106'. The communication frame is now sent to the second sub chain 115 of slave units 102'', 102''' via connection 104. The frame is first forwarded to the internally closed port 110'' and subsequently forwarded via port 111'' and port 110''' to the slave units 102'', 102''' where they are processed by the respective processing units 109.

This way the master control unit 101 is capable of compensating the disconnection between units 102' and 102''. It should be clear that a disconnection between slave units 102 and 102' or between slave units 102'' and 102''' is handled in the same way. Even a disconnection between the master control unit 101 and slave unit 102, i.e. connection 103, 104'''' can be resolved by sending the communication frame via connection 104, 104', 104'', 104''' to the first communication port 110 of slave unit 102 which is closed due to the disconnection. The communication frame is subsequently sent in forward direction through the chain of slave units 108 and eventually sent back via connection 103'''' to the input of the second communication port 106' of the master control unit 101.

A disconnection in the connection 104, 103'''' between the last slave unit 102''' and the master control unit 101 causes the second communication port 111''' of the last slave unit 102''' to be closed. Subsequently communication frames can be sent via the first communication port 106 of the master control unit 101 using connections 103 down the chain 102-102''' which are then looped back via the closed port 111''' of the last slave unit 102''' via connections 104', 104'', 104''' and 104'''' back to the input of the first communication port 106 of the master control unit 101. So any fault in the interconnection of slave units to the master control unit 101 can be compensated.

FIG. 2a shows a block diagram of a distributed control system according to the invention, wherein a second slave unit 201 provides the two ports needed to connect a chain of slave units 108 to the master control unit 101, where as a consequence only a single communication port 106 is required to perform communication from the master control unit 101 to the slave units 102-102''' of the chain of slave units 108.

Slave unit 201 is placed between the master control unit 101 and the chain of slave units 108. The slave unit 201 has three circularly internally interconnected communication ports 210, 211, 212, which are set in the open state. Each communication port 210, 211, 212 has an input and an output as described above. Consequently the input of the first communication port 210 is internally communicatively connected to the output of the second communication port 211, the input of the second communication port 211 is internally communicatively connected to the output of the third communication port 212, and the input of the third communication port 212 being internally communicatively connected to the output of the first communication port 210.

Slave unit 201 is similar to slave units 102-102'''. Thus slave unit 201 may have more than three communication ports. A case of four ports is shown in FIG. 2a. Such additional communication ports 213 may be in a closed state or be in an open state when a sub chain of slave units is connected to such communication port. In the example of FIG. 2a the additional fourth communication port 213 is in a closed state.

Commands sent from the first port 106 of the master control unit 101 via connection 203 are forwarded from communication port 210 of the slave unit 201 to the output of the second communication port 211. These communication frames are forwarded through the chain of slave units 108 to connection 103'''' to the input of the third communication port 212 of the slave unit 201. The frames are then forwarded to the output of the first communication port 210 and sent back to the first communication port of the master control unit 101.

By interconnecting the chain of slave units 108 as described above, a redundant path is created starting from the output of the third communication port 212 via connection 104-104'''' to the input of the second communication port 211 of the slave unit 201. As this redundant path is connected circularly to itself, during normal operation no communication frames are sent through this path. All communication occurs through the primary path 203, 103-103'''', 204.

Figure 2B:
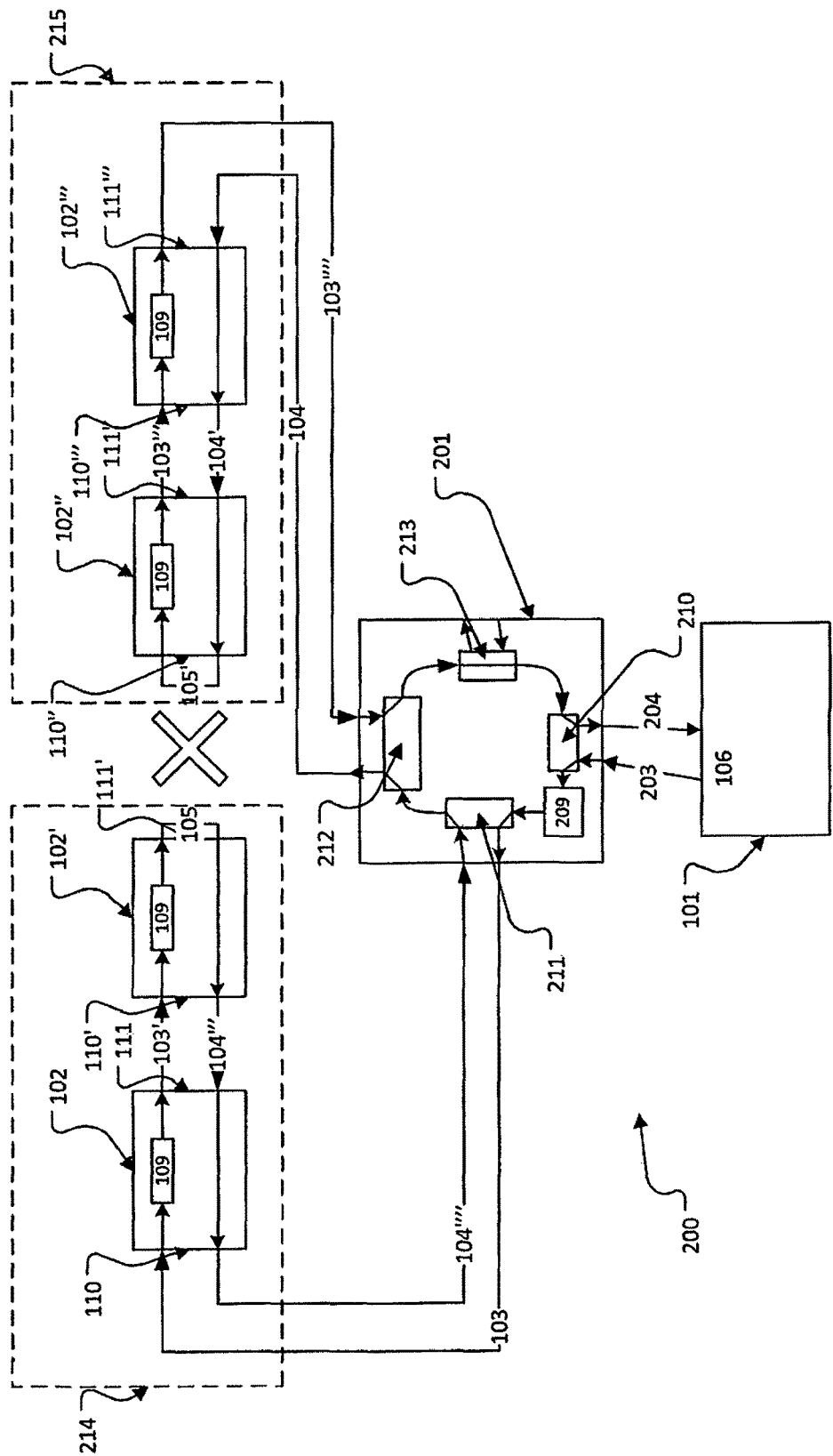
FIG. 2b shows a block diagram of a distributed control system after a disconnection according to the invention.

FIG. 2b shows a block diagram of the distributed control system according to FIG. 2a after a disconnection. A disconnection between slave units 102', 102'' for example causes the respective output port 111' and input port 110'' to be closed, indicated by internal interconnection 105, 105'. Communication frames sent from the master control unit 101, the first communication port 106 via connection 203 are forwarded via connections 103, 103' and looped back via the closed communication port 111' via connections 104''', 104'''' to the slave unit 201, using part of the redundant path of FIG. 2a.

Due to the configuration of the communication ports 211 and 212 of slave unit 201 the communication frames received at the input of communication port 211 are forwarded to the output of the third communication port 212 and sent via connection 104 to the second part of the redundant path 104, 104' and which are looped into the forward direction 103''', 103'''' to the input of the third communication port 212 and to the output of the first communication port 210 back to the input of the first communication port of the master control unit 101. From FIG. 2b it can also be concluded that even the order in which slave units 102, 102', 102'' and 102''' receive communication frames is the same as in FIG. 2a. So when a single disconnection occurs in a chain of slave units 108, safe operation of the system including the master control unit 101 slave unit 201 and the chain of slave units 108 is preserved.

In the configuration of FIG. 2b even a disconnection between the front slave unit 102 and slave unit 201 is resolved, by automatically closing port 211 and first forwarding the communication frame via route 104-104''' to port 110 of slave unit 102 which is also closed due to the disconnection. The communication frame then follows the route 103', 103'' (see FIG. 2a), 103''' and 103'''' back to the input of the first port 106 of the master control unit 101 via port 212, 213, and 210 of the slave unit 201. Likewise, a disconnection at the rear end of the chain in connections 104, 103'''', causes the second communication port 212 of the slave unit 201 to enter closed state. Also the communication port 111''' of slave unit 102''' enters closed communication state. Communication frames now sent from the first communication port 106 via connections 203, 103, 103', 103'' (see FIG. 2a), 103''' are looped back by the closed communication port 111''' to the input of the first communication port of the master control unit 101 via connections 104', 104'' (see FIG. 2a), 104''', 104'''' closed communication port 212, 213 and connection 204.

As all communication ports of slave unit 201 and 102-102''' are configured to enter a closed state when a disconnection at the respective communication port occurs, communication between the master control unit 101 and slave units 102-102''' is preserved without master control unit 101 intervention.

In the example described above is should be clear that the front slave unit 102 should be connected to the second communication port 211 which is open after the first communication port 210 which receives communication frames from the master control unit 101, whereas the rear slave unit 102''' of the chain of slave units 108 is to be connected to the third communication port 212 of the slave unit 201.

Between the first and second communication ports 210, 211 there may be other communication ports, but it is required that communication frames are forwarded from the input of the first communication port 210 to the output of the second communication port 211, and communication frames from the input of the second communication port are to be forwarded to the output of the third communication port 212 and communication frames from the input of the third communication port 212 are forwarded to the output of the first communication port 210.

Figures 3A, 3B:
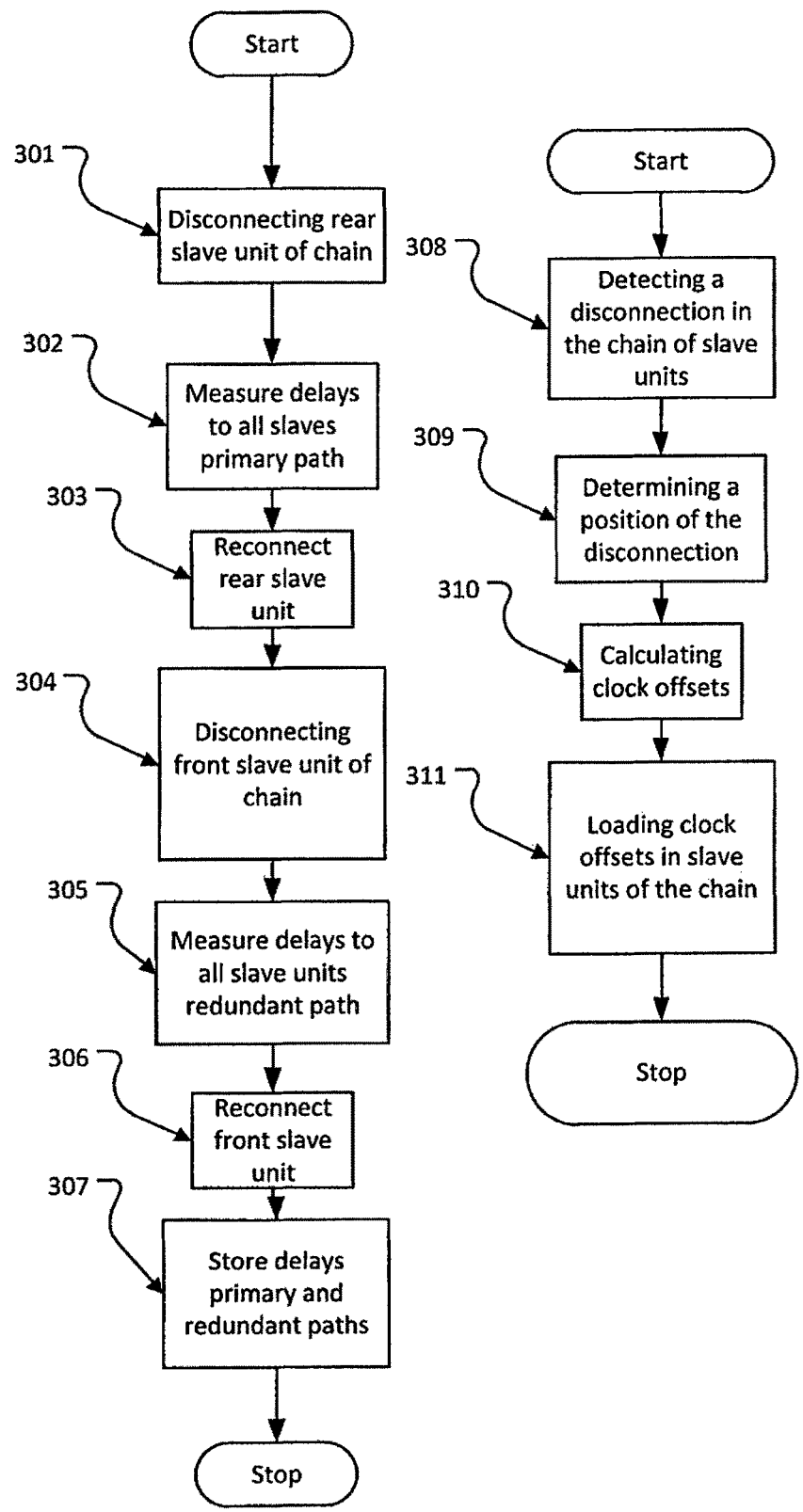
FIG. 3a shows a flow diagram of an embodiment according to the invention.
FIG. 3b shows a flow diagram of a further embodiment according to the invention.

FIG. 3a shows a flow diagram of an embodiment according to the invention. Slave units in a distributed industrial control system may utilise a system clock for synchronizing local applications with a reference clock, i.e. a System Time. For this purpose each slave unit has a local clock which initially runs independent from the reference clock and which can be synchronised with the reference clock and compensated by measuring the delays between the local clock and the reference clock and applying a clock offset in the respective slave units based on the measured propagation delays.

The use of a distributed clock (DC) is illustrated in [2], chapter 9, pages 65-86. Processing units 109-109''', 209 process according to DC operation. The goal of DC operation is that all slave units having a local clock, have this local clock synchronised with the reference clock. To that end, for DC operation, the master control unit 101 has to measure propagation delays for commands sent to the slave units 102-102''', 201 and send a correction value, i.e. a clock offset to each slave unit clock to compensate for the propagation delay. Measuring a propagation delay to a slave unit is for example performed by:
1. The master control unit sending a broadcast write to a port;
2. Each slave device stores the time of its local clock when the first bit of the Ethernet preamble of the frame was received, separately for each;
3. The master reads all time stamps and calculates the delay times with respect to the topology. The delay time between reference clock and the individual slave is written to a slave's delay register.

Referring to FIG. 2b, in order to maintain DC operation of the slave units 102-102''' with the master control unit 101, in an initialization phase propagation delays of communication frames are measured by the master control unit 101 via slave unit 201 and slave units 102-102''' in the chain of slave units 108 in forward direction and in reversed direction.

To measure propagation delays in forward direction, the rear slave unit 102''' is disconnected 301 from the third communication port 212 of the slave unit 201. Disconnection 301 can be performed by either physically disconnecting the rear slave unit 102''' from the third communication port of the second slave unit 201, or by setting the output port 111''' of slave unit 102''' in the closed state and setting the third communication port 212 in the closed state. Subsequently propagation delays in the respective slave units 102-102''' are measured 302. The results of the measurements in forward direction are stored 307 in a data storage 402 for the master control unit 101. From these results clock offsets which are required for DC operation can be calculated in forward direction. To return to normal operation of the system, the rear first slave unit 102''' is reconnected 303 to the third port 212 of the slave unit 201.

To measure propagation delays in reverse direction via the redundant path, the front slave unit 102 is disconnected 304 from the second communication port 211 of the slave unit 201. Disconnection 304 can be performed by either physically disconnecting the front slave unit 102 from the second communication port of the second slave unit 201, or by setting the input port 110 of slave unit 102 in the closed state and setting the second communication port 211 in the closed state. Now propagation delays can be measured 305 by sending communication frames via the redundant path 104, 104', 104'', 104''' which are looped back at communication port 110 of slave unit 102 via path 103', 103'', 103''', 103'''' and to the input of communication port 106 of the slave unit 101.

The results of the measurements in via the redundant path are stored 307 in the data storage 402 in the master control unit 101. From these results clock offsets which are required for DC operation can be calculated in forward direction, but via the redundant path. To return to normal operation of the system, the front first slave unit 102 is reconnected 306 to the second port 211 of the slave unit 201.

FIG. 3b shows a flow diagram of a further embodiment. A disconnection between two slave units in the chain of slave units 108 causes the communication ports of the slave units bordering the disconnection to be closed. This change of state of the port is communicated back to the master control unit 101 together with its identity by each respective slave unit. The disconnection is thus detected 308. By identifying the slave units and the respective ports having a change of status, the position of the disconnection is determined 309 by the master control unit 101. The master control unit 101 calculates 310 clock offsets from the previously measured and stored propagation delays of the respective slave units in sub chains 214, 215 arising due to the disconnection. After detection 308 of the disconnection and identification 309 of the slave units involved, the master control unit 101 calculates 310 the clock offsets for each slave unit 102-102''' depending on the position of the disconnection, i.e. the configuration of the sub chains 214, 215 and loads 311 the respective clock offsets in the slave units of the sub chains 214, 215. This allows continued DC operation of the respective slave clocks in the respective slave units.

Figure 4:
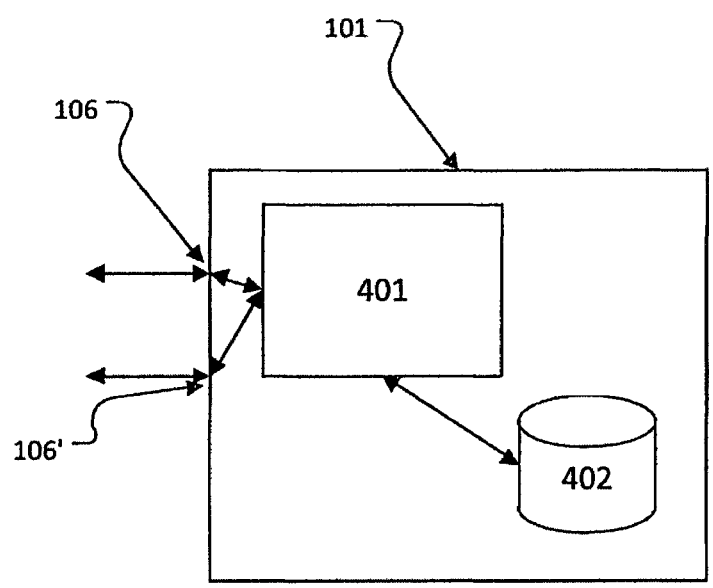
FIG. 4 shows a block diagram of a master control unit according to the invention.

FIG. 4 shows a block diagram of a master control unit used in the method and system described above. The master control unit 101 comprises a processing unit 401, arranged for at least one of data acquisition, data output, control and or regulating functions, using slave units 201, 102-102''' as described above. The master control unit 101 has at least one communication port 106, 106' for issuing commands to and receiving data back from slave units 201, 102-102''' connected to the communication port 106, 106' using communication frames. The master control unit 101 may further comprise further communication ports (not shown in FIG. 4) for exchanging data and/or commands or instructions from control system components at a higher aggregation level. The master control unit 101 further has a data storage 402 at its disposition for storing measured propagation delays in forward direction of a chain of slave units 108 and via a redundant path of the chain of slave units 108. The data storage 402 can be incorporated in the master control unit 101 as shown in FIG. 4. Alternatively the data storage 402 can be a separate module in the system 200, or be incorporated in another module. The master control unit 101 can be programmed with executable instructions to cause the processing unit 401 to perform certain control tasks.

LITERATURE REFERENCES

[1] EtherCAT Introduction, EtherCAT Technology Group (ETG), http://www.ethercat.org/pdf/english/EtherCA-T_Introduction_EN.pdf
[2] EtherCAT Slave Controller ESC Datasheet Section 1, version 2.1 dated Mar. 1, 2013, Beckhoff, http://download.beckhoff.com/download/Document/EtherCAT/Development_products/ EtherCAT_ESC_Datasheet_Sec1_Technology_2i1.pdf

The invention claimed is:

1. A method of connecting a plurality of first slave units to a second slave unit in a distributed control system, the method comprising:
    forming a chain of first slave units from the plurality of first slave units, wherein each of the plurality of first slave units and the second slave unit comprises a first communication port and a second communication port, and the second slave unit comprises a third communication port, and wherein
    the first communication port of the second slave unit, the second communication port of the second slave unit, and the third communication port of the second slave unit are circularly internally connected by internally connecting an input of the first communication port of the second slave unit to an output of the second communication port of the second slave unit, internally connecting an input of the second communication port of the second slave unit to an output of the third communication port of the second slave unit, and internally connecting an input of the third communication port of the second slave unit to an output of the first communication port of the second slave unit;
    communicatively connecting a master control unit to the first communication port of the second slave unit;
    communicatively connecting the first communication port of a front first slave unit of the chain of first slave units to the second communication port of the second slave unit; and
    communicatively connecting the second communication port of a rear first slave unit of the chain of first slave units to the third communication port of the second slave unit.

2. The method according to claim 1, further comprising:
    disconnecting the rear first slave unit of the chain of first slave units from the second slave unit;
    measuring, for each slave unit in the chain of first slave units, a first propagation delay via the second communication port of the second slave unit; and
    storing, for each first slave unit in the chain of first slave units, the first propagation delay in a data storage.

3. The method according to claim 2, wherein disconnecting the rear first slave unit of the chain of first slave units from the second slave unit comprises:
    closing the second communication port of the rear first slave unit of the chain of first slave units; and
    closing the third communication port of the second slave unit.

4. The method according to claim 2, further comprising:
disconnecting the front first slave unit of the chain of first slave units from the second slave unit;
measuring, for each slave unit in the chain of first slave units, a second propagation delay via the third communication port of the second slave unit; and
storing, for each first slave unit in the chain of first slave units, the second propagation delay in the data storage.

5. The method according to claim 4, wherein disconnecting the front first slave unit of the chain of first slave units from the second slave unit comprises:
closing the first communication port of the front first slave unit of the chain of first slave units; and
closing the second communication port of the second slave unit.

6. The method according to claim 5, further comprising:
detecting a disconnection of one of the first slave units in the chain of first slave units;
determining a position of the disconnection in the chain of first slave units on the basis of the detected disconnection of one of the first slave units;
calculating clock offsets for each first slave unit of the chain of first slave units depending on the determined position and the stored first and second propagation delays; and
loading the calculated clock offsets in each respective first slave unit of the chain of first slave units.

7. A distributed control system comprising:
a master control unit;
a plurality of first slave units, each of the plurality of first slave units comprising a first communication port comprising a first input and a first output and a second communication port comprising a second input and a second output, wherein
in each of the plurality of first slave units the first input is internally communicatively connected to the second output and the second input is internally communicatively connected to the first output, and
the plurality of first slave units are communicatively connected in a chain of first slave units; and
a second slave unit comprising a first communication port comprising a first input and a first output, a second communication port comprising a second input and a second output, and a third communication port comprising a third input and a third output, wherein
the first communication port of the second slave unit, the second communication port of the second slave unit, and the third communication port of the second slave unit are circularly internally connected such that the first input of the second slave unit is communicatively connected to the second output of the second slave unit, the second input of the second slave unit is communicatively connected to the third output of the second slave unit, and the third input of the second slave unit is communicatively connected to the first output of the second slave unit;
wherein
the master control unit is communicatively connected to the first communication port of the second slave unit;
the first communication port of a front first slave unit of the chain of first slave units is communicatively connected to the second communication port of the second slave unit; and
the second communication port of a rear first slave unit of the chain of first slave units is communicatively connected to the third communication port of the second slave unit.

8. The system according to claim 7, wherein the master control unit further comprises a processing unit configured with a program to perform operations comprising:
measuring, for each first slave unit in the chain of first slave units, a first propagation delay via the second communication port of the second slave unit, when the chain of first slave units is disconnected at the rear first slave unit from the second slave unit; and
storing, for each first slave unit in the chain of first slave units, the first propagation delay in a data storage.

9. The system according to claim 8, wherein the processing unit is further configured with the program to perform operations comprising:
closing the second communication port of the rear first slave unit of the chain of first slave units; and
closing the third communication port of the second slave unit.

10. The system according to claim 8, wherein the processing unit is further configured with the program to perform operations comprising:
measuring, for each first slave unit in the chain of first slave units, a second propagation delay via the third communication port of the second slave unit, when the chain of first slave units is disconnected at the front first slave unit from the second communication port of the second slave unit; and
storing, for each first slave unit in the chain of first slave units, the second propagation delay in the data storage.

11. The system according to claim 10, wherein the processing unit is further configured with the program to perform operations comprising:
closing the first communication port of the front first slave unit of the chain of first slave units; and
closing the second communication port of the second slave unit.

12. The system according to claim 10, wherein:
each of the first slave units are configured to detect a disconnection in the chain of first slave units; and
the processing unit is further configured with the program to perform operations comprising:
determining a position of the disconnection in the chain of first slave units on the basis of the detected disconnection of one of the first slave units,
calculating clock offsets for each first slave unit of the chain of first slave units depending on the determined position and the stored first and second propagation delays, and
loading the calculated clock offsets in each respective first slave unit of the chain of first slave units.

13. The master control unit for the distributed control system according to claim 7, the master control unit comprising:
a processing unit; and
at least one communication port for connecting to at least the second slave unit, wherein
the processing unit is communicatively connected to the at least one communication port, and
the processing unit is configured with a program to perform operations comprising:
measuring, for each first slave unit in the chain of first slave units, a first propagation delay via the second communication port of the second slave unit, when the chain of first slave units is disconnected at the rear first slave unit from the second slave unit; and storing, for each first slave unit in the chain of first slave units, the first propagation delay in a data storage.

14. The master control unit according to claim 13, further comprising the data storage.

15. The master control unit according to claim 13, wherein the processing unit is further configured with the program to perform operations comprising:

closing the second communication port of the rear first slave unit of the chain of first slave units; and closing the third communication port of the second slave unit.

16. The master control unit according to claim 15, wherein the processing unit is further configured with the program to perform operations comprising:

measuring, for each first slave unit in the chain of first slave units, a second propagation delay via the third communication port of the second slave unit, when the chain of first slave units is disconnected at the front first slave unit from the second communication port of the second slave unit; and storing, for each first slave unit in the chain of first slave units, the second propagation delay in the data storage.

17. The master control unit according to claim 16, wherein the processing unit is further configured with the program to perform operations comprising:

closing the first communication port of the front first slave unit of the chain of first slave units; and closing the second communication port of the second slave unit.

18. The master control unit according to claim 16, wherein the processing unit is further configured with the program to perform operations comprising:

detect a disconnection in the chain of first slave units;

determining a position of the disconnection in the chain of first slave units on the basis of the detected disconnection of one of the first slave units;

calculating clock offsets for each first slave unit of the chain of first slave units depending on the determined position and the stored first and second propagation delays; and loading the calculated clock offsets in each respective slave unit of the chain of first slave units.

\* \* \* \* \*